United States Patent [19]

Sakai et al.

[11] Patent Number: 4,539,634
[45] Date of Patent: Sep. 3, 1985

[54] MODIFICATION OF MACHINING PROGRAM IN A NUMERICAL CONTROL MACHINE TOOL

[75] Inventors: Takayoshi Sakai, Kagamihara; Kiyohisa Mizoguchi; Masazumi Hayakawa, both of Nagoya, all of Japan

[73] Assignee: Yamazaki Machiner Works, Ltd., Aichi, Japan

[21] Appl. No.: 462,076

[22] Filed: Jan. 28, 1983

[30] Foreign Application Priority Data

Feb. 2, 1982 [JP] Japan .................... 57-15275

[51] Int. Cl.³ .................... G05B 19/18; G06F 15/46
[52] U.S. Cl. .................... 364/167; 364/171; 364/181; 364/188; 364/192; 318/569
[58] Field of Search .......... 364/167, 171, 180–181, 364/188–189, 191–193, 474–475, 513; 318/568–569; 82/2 B; 901/20

[56] References Cited

U.S. PATENT DOCUMENTS

| | | | |
|---|---|---|---|
| 3,671,727 | 6/1972 | Rhoades | 364/167 X |
| 3,816,723 | 6/1974 | Slawson | 364/192 X |
| 4,105,937 | 8/1978 | Tuda et al. | 318/568 |
| 4,108,090 | 8/1978 | Landau, Jr. et al. | 318/568 X |
| 4,115,684 | 9/1978 | Lindbom | 318/568 X |
| 4,314,330 | 2/1982 | Slawson | 364/192 |
| 4,370,704 | 1/1983 | Fukuyama et al. | 364/171 |
| 4,380,796 | 4/1983 | Ostby | 364/171 |
| 4,437,150 | 3/1984 | Dahlgren, Jr. et al. | 364/474 |

FOREIGN PATENT DOCUMENTS

| | | |
|---|---|---|
| 2025086 | 1/1980 | United Kingdom . |
| 1584645 | 2/1981 | United Kingdom . |
| 2054199 | 2/1981 | United Kingdom . |
| 2054203 | 2/1981 | United Kingdom . |
| 2062898 | 5/1981 | United Kingdom . |

Primary Examiner—Joseph Ruggiero
Assistant Examiner—Gary V. Harkcom
Attorney, Agent, or Firm—Cushman, Darby and Cushman

[57] ABSTRACT

A numerical control machine tool is adapted to operate in accordance with a machining program stored in a memory. The numerical control machine tool is provided with a program amendment command means capable of outputting a program amendment command. When the program amendment command is issued, the operation speeds of the machine tool set in the machining program in the memory are rewritten and amended to the speeds optimum for the instant machining demand. Once this amendment is made, the repetition of the machining cycle for consecutive works can be made at the optimum speeds without requiring speed adjustment for each machining cycle.

3 Claims, 1 Drawing Figure

MODIFICATION OF MACHINING PROGRAM IN A NUMERICAL CONTROL MACHINE TOOL

BACKGROUND OF THE INVENTION

The present invention relates to an arrangement for changing a machining program in a numerical control machine tool having an override command means such as an override switch.

Usually, when the spindle rotation speed or feed speed set in the machining program for a numerical control machine does not meet the demand, the operator manipulates the override command means such as an override switch to obtain optimum spindle rotation speed or feed speed for the demanded cutting condition. In addition, when a machining cycle includes a plurality of steps which are to be performed by different tools, it is necessary to adjust the spindle rotation speed or the feed speed for each of these steps performed by respective tools.

Hitherto, however, the adjustment of speed effected through the override switch is merely to change the speed set by the machining program, and is not to amend the program itself. Therefore, in a machining operation in which a machining cycle consisting of a plurality of steps is repeatedly executed, the operator is obliged to repeatedly adjust the speed at each time the new step is commenced in each of the repetitional machining cycles. Such frequent adjustment is extremely troublesome and tends to incur erroneous operation.

SUMMARY OF THE INVENTION

Accordingly, an object of the invention is to provide a method of controlling amendment of a machining program in a numerical control machine tool, which is improved to eliminate the necessity of repetition of speed adjustment for repetitional machining cycles.

To this end, according to the invention, there is provided a method of controlling amendment of a machining program, which employs a program amendment command means capable of outputting a program amendment command. When the program amendment command is given at the time of machining, the set speed in the machining program is rewritten and amended to an optimum speed provided by the override command means.

Other objects, features and advantages of the invention will become clear from the following description of the preferred embodiment taken in conjuction with the accompanying drawings.

BRIEF DESCRIPTION OF THE DRAWINGS

The attached sole

DESCRIPTION OF THE PREFERRED EMBODIMENT

Figure 1:
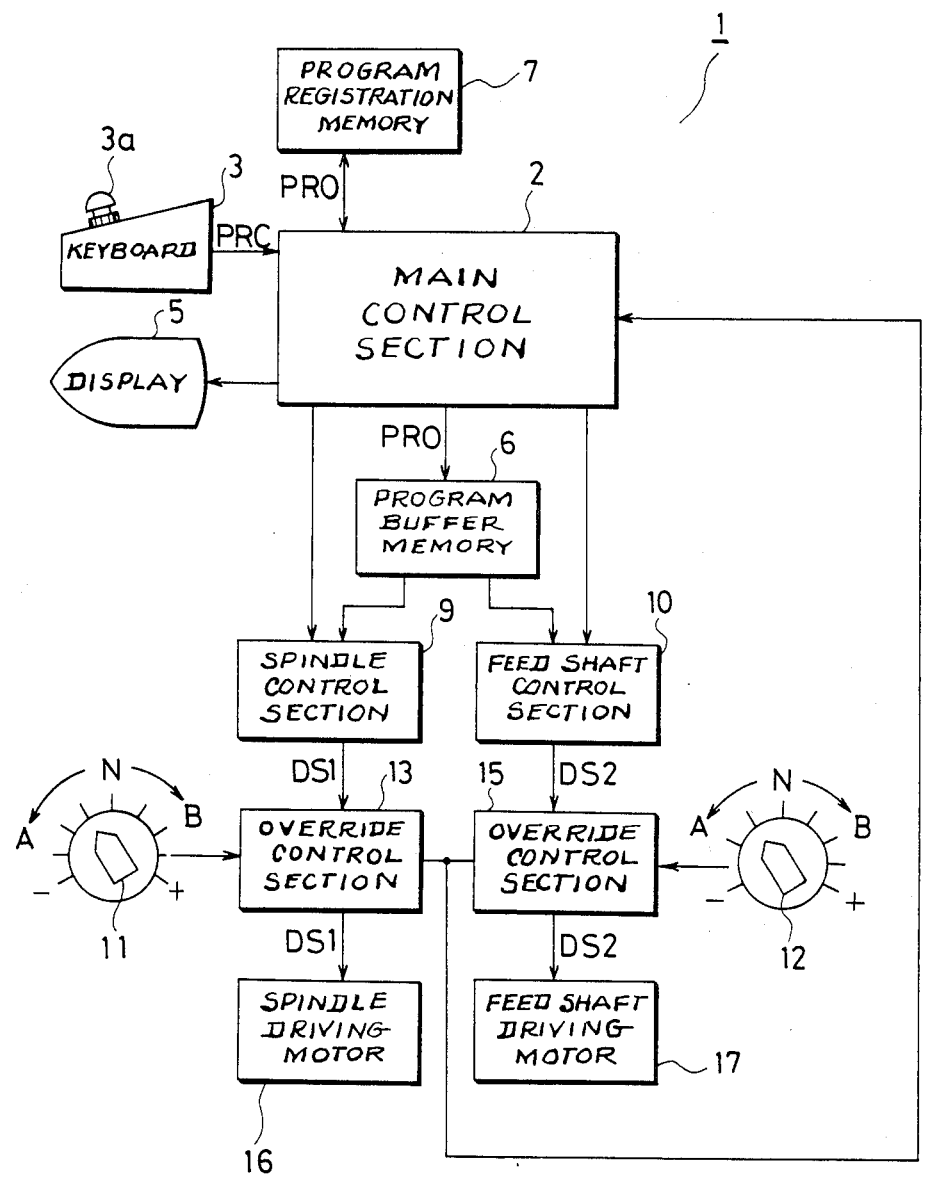
FIG. 1 is a block diagram of an example of the controlling section of a numerical control lathe to which the present invention is applied.

A preferred embodiment of the invention will be described hereinunder with reference to the accompanying drawing.

A numerical control lathe generally designated by reference numeral 1 as a typical example of numerial control machine tools have a main control section 2 to which are connected a keyboard 3 having a program amendment command switch 3a as the machining program amendment commanding means, a display 5, a program buffer memory 6, a program registration memory 7 storing a plurality of machining programs PRO and so on. A spindle control section 9 is connected in one hand to the main control section 2 and on the other hand to the buffer memory 6 to which connected also is a feed shaft control section 10. Override switches 11 and 12 are connected to override control sections 13 and 15 which in turn are connected to control sections 9 and 10, respectively. A spindle driving motor 16 and a feed shaft driving motor 17 are drivingly coupled to the override control sections 13 and 15, respectively. The control sections 13 and 15 on the other hand are connected to the main control section 2.

The numerical control lathe 1 having the described construction operates to conduct a machining on a work in a manner explained hereinbelow. The main control section 2 reads out from a program registration memory 7 a machining program PRO which is to be used in the machining of the work, and sends the machining program PRO to the program buffer memory 6 to store the same in the latter. The main control section 2 then starts up the spindle control section 9 and the feed shaft control section 10 so that these control sections deliver driving signals DS1 and DS2, respectively, to the spindle driving motor 16 and the feed shaft driving motor 17 through respective override control sections 13 and 15 so that the motors 16 and 17 operate at speeds which are set in the machining program PRO stored in the program buffer memory 6. The operator can commence the machining immediately if the spindle rotation speed and the feed speed of feed shaft are optimum for the machining of the work. However, when the speeds are inadequate for the machining, override switches 11 and 12 are manipulated and rotated in the direction of arrow A or B. When the switches 11 and 12 are rotated in the direction of the arrow A from the neutral positions N, the override control section 13 and 15 amend the driving signals DS1 and DS2 to retard the speeds of the driving motors 16 and 17 from the speeds set in the machining program PRO by an amount proportional to the angles of rotations of the switches 11 and 12. To the contrary, when the switches 11 and 12 are rotated in the direction of the arrow B, control section 13 and 15 amend the speeds of the motor 16 and 17 to increase from the speeds set in the machining program PRO in proportion to the angles of rotations of the switches 11 and 12. The operator manipulates, after suitably adjusting the spindle speed and feed shaft speed by the switches 11 and 12 in a manner described, the program amendment command switch 3a on the key board 3 thereby to deliver a program amendment command PRC to the main control section 2. In response to this command PRC, the main control section 2 reads out from the override control section 13 and 15 the actual rotation speeds of the motors 16 and 17, i.e. the spindle speed and the feed shaft speed, and rewrites the spindle speed and feed shaft speed initially set for this step in the machining program PRO stored in the registration memory 7 and the buffer memory 6 into optimum speeds obtained through manipulation of override switches 11 and 12 by the operator. The lathe 1 then executes the first machining step in the machining program PRO and, as this step is over, the lathe 1 commences the next step in the machining program PRO. Needless to say, the next step has to be done under different machining conditions such as cutting position, cutting tool and so forth, and spindle speed and feed shaft speed optimum for these machining conditions are beforehand set for this next step in the machining program PRO. The operator, therefore, effects the adjustment in the same way as that described before for each of the steps in the program and then manipulates the switch 3a to rewrite the initial set speeds in each step in the program PRO into those obtained through the adjustment made by the operator, so that the steps are performed at the adjusted speeds. Consecutive steps of one machining cycle are thus performed at optimum spindle speed and feed shaft speed. When a cycle of machining operation is completed with one work, the next cycle of machining is commenced with new work by the same machining program PRO. According to the invention, since the machining program has been already rewritten and amended to provide optimum speeds attained through adjustment made by the operator, the motors 16 and 17 are made to operate by the spindle control section 9 and the feed shaft control section 10, without necessitating the repetition of manipulation of the override switches 11 and 12, in accordance with the amended machining programs PRO at the same optimum speeds as those performed in the initial machining cycle.

Although the invention has been described through specific reference to a numerical control lathe 1, it will be clear to those skilled in the art that the invention can be applied not only to the lathe but to any other type of numerical control machine tool as well.

As has been described, according to the invention, there is provided a method of controlling amendment of a machining program employing a program amendment command means such as a program amendment command switch 3a for amending a machining program PRO. As the operator determines optimum speeds through the manipulation of an override command means such as override switches 11 and 12, the program amendment command means issues a program amendment command PRC to rewrite and amend the speeds initially set in the machining program PRO to the optimum speeds determined by the operator through the manipulation of the override command means. When there is a demand for a repetition of a machining cycle for consecutive works, once this amendment is made by the operator in the course of the execution of the first cycle, the consecutive cycles are performed at the optimum speeds without requiring manipulation of the override switches for each of the consecutive cycles. In consequence, the speed adjusting work to be carried out by the operator is remarkably simplified which in turn reduces the possibility or chance of erroneous operation which hitherto has been more or less incurred inevitably in the course of repeated speed adjusting work conducted by the operator.

Although the invention has been described through specific terms, it is to be noted that the described embodiment is only illustrative but not exclusive, and various changes and modifications may be imparted thereto without departing from the scope of the invention which is limited solely by the appended claims.

What is claimed is:

1. A numerical control machine tool comprising:
    a program memory for storing a machine program having steps to be sequentially executed;
    a spindle for relatively turning a workpiece and machining tool;
    a spindle driving motor for driving said spindle;
    a feed shaft for relatively moving a workpiece being machined and a machining tool;
    a feed shaft driving motor for driving said feed shaft;
    means for controlling said spindle driving motor and feed shaft driving motor to operate in accordance with speeds defined by a step of the program being executed;
    operator manipulatable spindle override means for controlling spindle speed regardless of the speed called for by the program step being executed;
    operator manipulatable feed shaft override means for controlling feed shaft speed regardless of the speed called for by the program step being executed;
    operator manipulatable program amendment command means for generating a program amendment instruction when actuated; said instruction causing the machining step being executed to be amended in program memory to define speeds called for by said spindle override means and feed shaft override means; and
    means, responsive to said program amendment means, for causing said machine tool, on further executions of said program step, to operate in accordance with the speeds called for by said spindle and feed shaft override means without the need for further manipulation of said program amendment command means.

2. In a numerical control machine having program memory storing at least one machining program corresponding to each workpiece to be machined, a spindle driving motor and at least one feed shaft driving motor which are adapted to operate at basic speeds defined by a particular machining program which corresponds to a workpiece to be machined in actual machining and which is read out from said program memory, and operator actuable override command means, adapted to be manipulated by an operator to override said basic speeds set in said read out machining program and cause said machine tool to operate at speeds optimum for the machining to be performed; a method of amending the machining program comprising the steps of:
    manipulating said override command means to provide a program amendment command;
    rewriting, in response to said amendment command, said basic speeds of said read out program into optimum speeds set by said override command means; and
    operating said numerical control machine, for further executions of the readout program, in accordance with the rewritten optimum speed without the necessity of further manipulation of said override command means.

3. A method according to claim 2, wherein said numerical control machine is a numerical control lathe.

* * * * *